STACKED SOLID STATE RECTIFIER

Filed Jan. 3, 1963 2 Sheets-Sheet 1

INVENTORS
THOMAS H. ROGERS
FRANK E. KAPELEWSKI
BY Francis J. Thornton
ATTORNEY

INVENTOR
THOMAS H. ROGERS
FRANK E. KAPELEWSKI
BY
Francis J. Thornton
ATTORNEY 3,307,087

STACKED SOLID STATE RECTIFIER

Thomas H. Rogers, New Canaan, and Frank E. Kapelewski, Stamford, Conn., assignors, by mesne assignments, to The Machlett Laboratories, Inc., Springdale, Conn., a corporation of Connecticut Filed Jan. 3, 1963, Ser. No. 249,156
7 Claims. (Cl. 317—234)

This invention relates generally to rectifying devices and more particularly to solid state rectifiers of the kind where a plurality of rectifying cells are assembled in a stack.

It is well known to the electronic art that a plurality of individual rectifying cells can be combined in a single structure to provide greater voltage or power handling capabilities than can be provided by any individual unit.

In the prior art, one practice has been to mount a number of individually encapsulated rectifier units each containing a single rectifier cell in a suitable supporting structure and to connect these units in series by electrically joining their terminals by means of interconnecting leads. In such a device, it has generally been found necessary to shunt each individual rectifier unit with a capacitor and a resistor in parallel in order to prevent steep wavefront voltage surges from building up across individual units at the terminus of the interconnected group. It was found necessary in devices of the prior art to provide means such as heat dissipating fins whereby such devices could be air cooled. Such air cooling was accomplished by mounting individually encapsulated diodes on metallic plates to form an extended heat dissipating surface in which a structural frame of electrical insulation supported the plates in parallel, spaced-apart relationship so that passage of air could flow between the plates.

The present invention, however, avoids the above-described difficulties found in the prior art. The present invention combines solid state rectifying cells in a series relationship whereby there is provided a capability for rectifying unusually high voltages. In this structure individual cells are not individually encapsulated but are series connected by direct abutment of the unencapsulated cells with one another without the necessity of interconnecting leads. This avoidance of encapsulation of the individual units with their respectively conducting leads provides a rectifier assembly in which inductance is substantially avoided and essentially eliminated. These and other advantages of the present invention are obtained from the construction of the device in which the individual cells surrounded by a high dielectric constant material which may be contained within an appropriate body of good heat dissipating properties to provide a stack rectifier assembly in which there is inherently a resistive-capacitive network in parallel with each rectifying cell thereby resulting in long life, better operating characteristics, smaller size and lower assembly costs than any produced by the prior art. Additionally, the structure of the present invention is readily incorporated into compact power supplies for apparatus used in X-ray service and the like at voltages greater than 100 kilovolts.

Briefly, the structure of the assembly comprises individual unit cells arranged so that each cell is electrically connected to the other in series and surrounded by a dielectric medium. In a preferred form of this invention, the individual diode cells comprise a silicon semiconductor body having a P–N junction therein individually mounted on thin metallic discs or mounting plates, which are series connected to one another by direct abutment thereof without interconnecting leads. The entire stack of cells is then mounted in a single encapsulated enclosure, preferably a hollow cylindrical body having an inside diameter just slightly larger than the diameter of the mounting plates so that the latter, when stacked, will be held in good alignment. The space between the mounting discs is partially provided by an annular separator of high resistivity material. This separator holds the individual cells in alignment and further acts as a high resistance element shunting the corresponding cell. The remainder of the space within the encapsulating enclosure is filled with a high dielectric strength fluid having a dielectric constant greater than unity. This is, in effect, adding an electrical circuit element comprising the capacitance, represented by the area of the two adjacent mounting plates in close proximity to one another separated by the high dielectric material in parallel with each cell. Heat generated in the cells during operation of the assembly is absorbed by the metallic mounting discs, which further provide mechanical support for each cell, and transmitted through the medium of the dielectric fluid to the walls of the enclosure. The enclosure or body may be made of any good electrical insulating material which has, in addition, a high order of heat conductivity. The individual cells preferably consist of diffused silicon junctions produced in manners well known to the art. By the arrangement above-described, the intercell connecting wires were eliminated and thus intercell inductance of the assembly is reduced essentially to zero.

Further, the terminal build-up of surge voltage peaks tends to be proportional to the surge impedance of the stack which tends to act like a "transmission line" whose surge impedance is $\sqrt{L/C}$. By reducing the inductance, L, to essentially zero, the impedance and thus the corresponding surge voltage peak at the terminal, are greatly minimized.

High voltage rectifying devices constructed according to this invention, in various forms, have been found to operate in surge-prone circuits fully as satisfactory as conventional prior art devices employing large, separate shunting resistor-capacitor networks.

Other advantages of the invention will be apparent from the following detailed description, taken in connection with the accompanying drawings, in which:

FIG. 1 is an axial sectional view of one assembly of the type contemplated by the present invention;

FIGS. 2 and 2*a* are greatly enlarged cross sections of individual diode cells;

Figure 1:
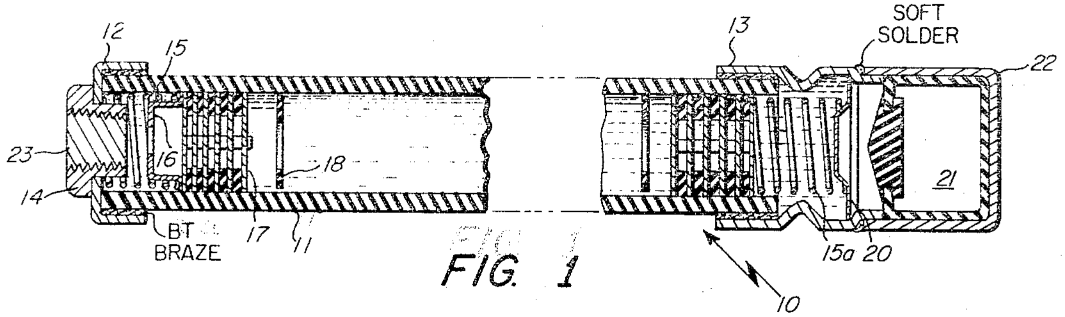

Referring now to FIG. 1, there is shown in section one embodiment of the stacked solid state rectifier assembly designated generally as 10. This rectifier assembly consists of a ceramic body 11, having mounted on one end a cap 12 and on the other end thereof a spring housing 13. The body 11 preferably comprises a tubing composed, for example, of 96% vitreous alumina ceramic. To provide suitable means for attaching the end cap 12 and the spring housing 13 to the body 11, it is preferable that approximately ¼" of each end of the body 11 be provided with a metalized surface such as nickel plate (not shown). This nickel plate permits brazing of the end cap 12 and the spring housing 13 to the body 11. It has been found that a suitable braze may be made by using any known brazing material such as, for example, the well known silver-copper eutectic solder.

Inserted in end cap 12 and brazed thereto using the above-described material is a seal 14 having a threaded hole therethrough. A suitable compression spring 15, whose ends are squared and ground, and which may be made, for example, of 0.36 music wire, is seated in the end cap 12 and around the seal 14. This spring is long enough so that adequate compression may occur and preferably has a ⅛" pitch.

There is then inserted in the spring 15 a stacking button 16. This button 16, in one form, preferably has a dish-like shape having an annulus in the bottom of the dish and further having a lip which provides adequate contact to spring 15 in order that suitable compressive forces may be applied to the diode cells 17 contained in the assembly 10. The individual diode cells 17 interposed with spacers 18 are inserted into body 11 in the number required to meet the specified voltage of the device. These spacers preferably are such that they have a resistivity range of $10^8$ ohm/cm.$^3$ to $10^{13}$ ohm/cm.$^3$. Spring housing 13 is on the end of body 11 opposite to end cap 12. Housing 13 has a first ridge therein so that it will seat squarely against the end of body 11 and a second ridge which holds a spring retainer 20. Housing 13 also contains beneath the retainer 20 a second compression spring 15*a* which is identical to spring 15. An expansion unit 21 which may comprise, for example, an air-filled rubber bag or a metallic bellows is contained in a metallic housing 22, which housing is attached to the spring housing 13 by any suitable means such as lead-tin solder or welding. The assembly may now be filled with a suitable fluid such as the silicone fluid sold as Dow-Corning 200 or any fluid having a dielectric constant greater than 1 and is capable of conducting heat to the body 11. Preferably, the dielectric constant of this fluid is 2 or 2.5. Inserted in the threaded seal 14 is a seal plug 23.

This device is one whose mechanical structure, electrically speaking, provides a resistive-capacitive network in parallel with the rectifiers and further provides a stacked solid state rectifier assembly having little or no inductance. The assembly further has been found to have extremely long life and durability. Electrically, the device will rectify alternating current, yet because of the construction of the assembly, that is, the configuration of the diode cells 17 and the dielectric fluid and spacer 18 contained therebetween, there is provided a capacitive and resistive effect in parallel with each individual diode cell whereby any voltage surge applied to the device tends to be evenly distributed among all the cells in the stack.

The device described in FIG. 1 when the tubing 11 is 6¾" long and contains 175 diode cells whose individual breakdown voltage is 600 volts or greater, provides an 80 kilovolt rectifier stack. By either increasing the length or the individual diode cell breakdown voltage, higher voltage assembly stacks may be provided. For example, using 600 volt diode cells and a tubing whose length is approximately 9", 125 kilovolt assemblies may be achieved.

Figure 2:
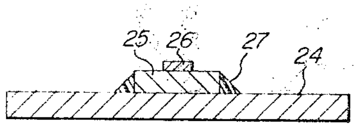
Figure 2A:
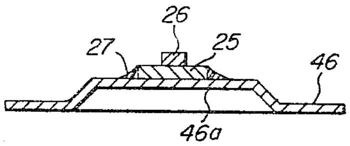

FIGS. 2 and 2*a* show in detail individual cell assemblies 17. The unit shown in FIG. 2 comprises a flat disc 24 having mounted thereon a silicon chip 25. Chip 25 is provided with a P-N junction. Disc 24, when used in the embodiment described in FIG. 1, may be a steel disc approximately ½" in diameter which has a base nickel plate and a gold finish plate thereon. A contact 26, preferably comprising a silver disc, is mounted on the surface of the silicon chip 25 which may be provided with a layer of silicone varnish 27 that has been baked thereon, as is well known to the semiconductor art. One such suitable silicone varnish is sold under the name of Dow-Corning 935.

Figure 6:
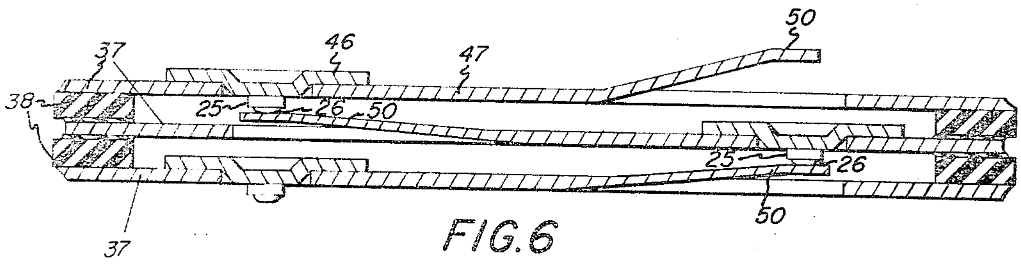
FIG. 6 is an enlarged sectional view of the assembly details of the internal components of a high power device.
Figure 7:
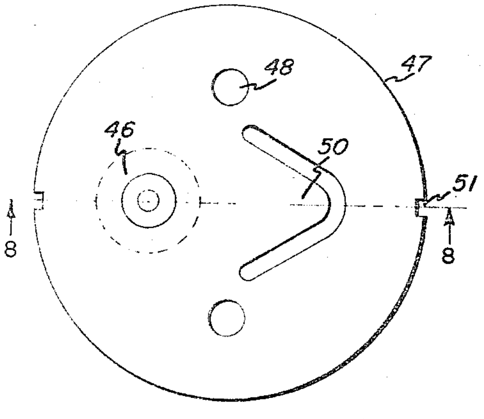
FIG. 7 shows a plan view of a disc utilized in the assembly of FIG. 6.

FIG. 2*a* is substantially the same as FIG. 2 except that the disc 46 has a dish portion 46*a* therein, upon which the silicon chip 25 sits surrounded by the baked-on varnish 27. Such an assembly is shown in FIGS. 6 and 7.

Figure 3:
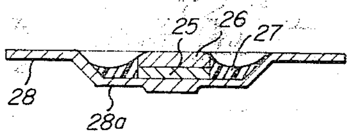
FIG. 3 is another embodiment of an individual diode cell.

FIG. 3 is essentially the same as FIG. 2 except that the disc 28 has a dished portion 28*a* therein in which the silicon chip 25 sits surrounded by the baked-on varnish 27.

Figure 4:
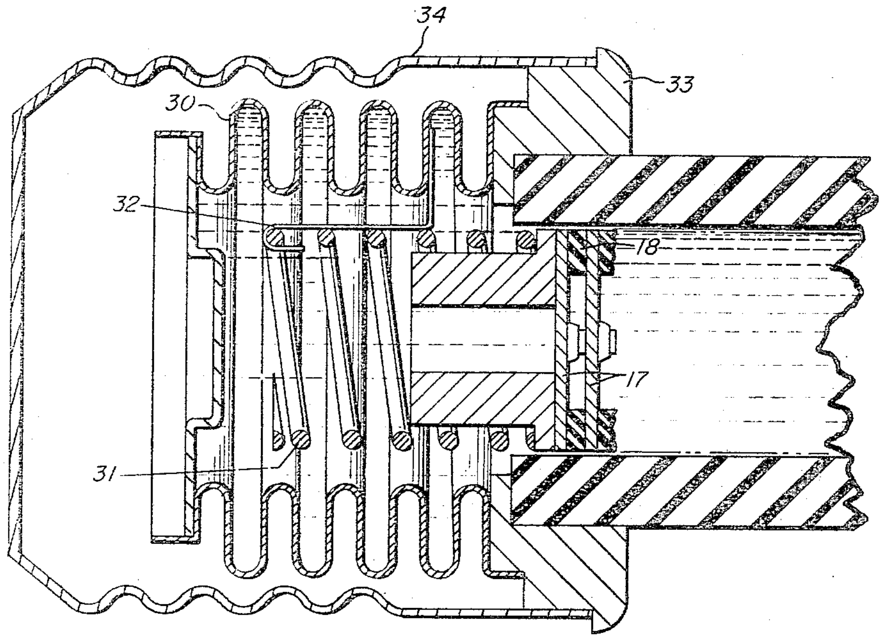
FIG. 4 is a sectional view of an alternate embodiment of one end of the device shown in FIG. 1.

FIG. 4 is an enlarged drawing of one end of the device wherein there is used a metallic bellows in place of the expansion chamber 21 of FIG. 1 and having a further refinement in that a screw-type lamp base is suitably affixed thereto.

In FIG. 4, there is shown an expansion chamber in the form of a metallic bellows 30 affixed to the end of the body 11. A suitable compression spring 31 is mounted in the bellows by means of suitable metal spring retainer clips 32 and provides suitable compression forces to the diode cells 17. Surrounding the bellows and affixed to the end of body 11 is a structure comprising a metallic ring 33 brazed to the body 11 which has soldered thereto a housing 34 which has a configuration such that it is suitable for insertion in a standard mazda lamp base.

Figure 5:
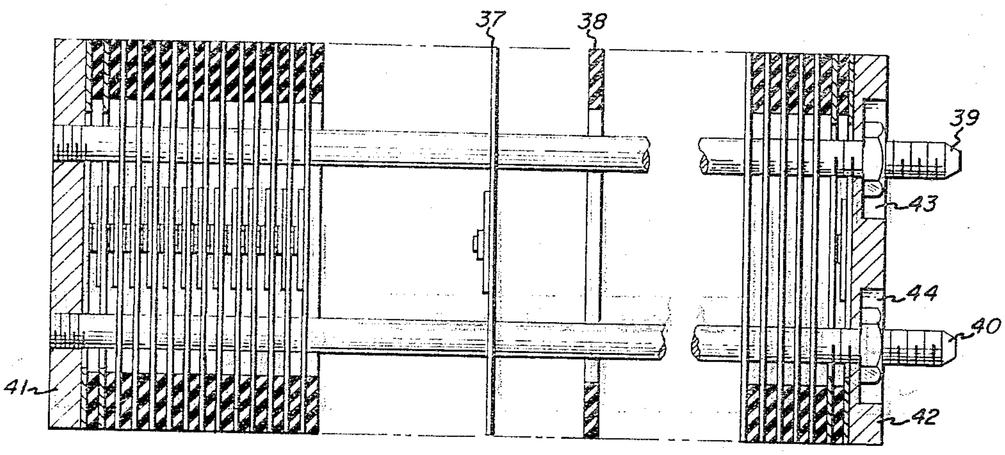
FIG. 5 is a sectional view of an embodiment of a higher power assembly.

FIG. 5 shows a similar structure to that of FIG. 1, except, however, it is suitable for higher currents and has the outer ceramic body assembly details eliminated. The device shown in FIG. 5 consists of a series of diode cell assemblies 37 and insulators 38, alternately mounted on assembly rods 39 and 40 so that each diode is series connected to the other. Rods 39 and 40 are suitably threaded to an end plate 41 and having a second end plate 42 provided with suitable mounting nuts 43 and 44 respectively. Rods 39 and 40 are made from a suitable insulating material such as nylon. The device shown in FIG. 5 has been found to be suitable for higher currents since the diode cell assemblies 37 provide a greater heat dissipation than that provided in the embodiment described in FIG. 1.

FIGS. 6 and 7 show in greater detail the construction of diode cell assembly 37. FIG. 6 shows the diode unit 46 welded to a silver-plated disc 47 of suitable diameter. The disc 47 is provided with two suitably placed holes 48 and 49 and a contact finger 50 stamped into the disc. The disc 47 may further be provided with indexing notches 51 and 52 to provide facility in stacking. These indexing notches can be omitted if desired.

FIG. 6 shows in greater detail the insulators 38 and diode cell assemblies 37 of FIG. 5. As shown in FIG. 7, the diode cell assembly consists of the disc 47 of FIG. 6 to which is welded a diode cell 46 identical to that shown in FIG. 2*a*. The insulating spacers 38 may be any suitable material which is not adversely affected by the silicone fluid with which the device is filled, as described in conjunction with FIG. 1. The contact finger 50 shown in FIG. 6 makes contact with the silver disc 26 which is provided on the top of the silicon chip 25.

Figure 8:
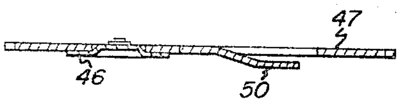
FIG. 8 shows a sectional view along the lines 8—8 of the disc shown in FIG. 7.

FIG. 8 shows a sectional view taken along the lines 8—8 of the disc shown in FIG. 7, which shows in greater detail the mounting of the diode cell 46 and the configuration of contact finger 50.

In the described embodiments of the invention the plates to which the silicon chips are attached either in the diode cell 17 of FIG. 1 or the diode cell assembly 37 of FIG. 5, serve not only to provide the capacitive effect between one another with the silicone fluid contained between them, but also serve as heat dissipating fins, while the spacers inserted between these plates serve as resistive means in addition to the dielectric medium and provide a means whereby such a high voltage rectifier may be easily and cheaply assembled.

This completes the description of several embodiments of the invention. However, many modifications of the invention will be apparent to persons skilled in the art. Accordingly, it is desired that this invention not be limited except as defined by the appended claims.

What is claimed is:

1. A rectifier assembly comprising a hollow dielectric body, a stack of rectifier components contained within said body, each component comprising a disclike metal member and a semiconductor junction device disposed on said metal member and having a contact thereon which is in direct engagement with the next adjacent metal member in the stack, electrically resistive spacers having insulative and resistive properties interposed between said components, each spacer being of a thickness matching the thickness of a respective junction device and contact thereon whereby each spacer is engaged on one side by a respective metal member and on the other side by the metal member of the next adjacent component, and a medium having a dielectric constant greater than 1 surrounding said components and contained within said body, said spacers and said medium providing a resistive-capacitive network in parallel with said components.

2. A rectifier assembly comprising a body including approximately 96% vitreous alumina ceramic, a stack of rectifier components contained within said body, said rectifier components each comprising a junction diode mounted on a stack button, insulating spacers interposed between said components and having a resistance greater than 800 megohms per inch and a dielectric constant at 1 megacycle of 7.3, a medium having a dielectric constant greater than 1 surrounding said components and contained within said body to provide a resistive-capacitive network in parallel with said components, said medium consisting of a silicone fluid, and electrical contacts at either end of said body whereby alternating voltages may be introduced into said assembly and rectified thereby.

3. A rectifier assembly comprising a body consisting of 96% vitreous alumina ceramic and having a metallic end cap mounted on one end thereof, and at the other end thereof an expansion chamber, a stack of rectifier components contained within said body, said rectifier components each comprising a junction diode mounted on a stacking button, insulating spacers interposed between said components and having a resistivity ranging between $10^8$ ohm/cm.$^2$ and $10^{13}$ ohm/cm.$^3$ and a dielectric constant at one megacycle of 7.3, a medium having a dielectric constant greater than 1 surrounding said components and contained within said body, said spacers and said meduim providing a resistive-capactive network in parallel with said components, said medium consisting of a silicone fluid, and electrical contacts to either end of said body whereby high power alternating currents may be introduced into said body and rectified therein.

4. A rectifier assembly comprising a body consisting of

96% vitreous alumina ceramic and having a metallic end cap mounted on one end thereof, and at the other end thereof an expansion chamber, said expansion chamber comprising an air-filled metallic lamp base containing an expandable metallic bellows, a stack of rectifier components contained within said body, said rectifier components comprising a junction diode mounted on a stacking button, spacers having insulative and resistive properties interposed between said components, said spacers having a resistance greater than 800 megohms per inch and a dielectric constant at 1 megacycle of 7.3, a medium having a dielectric constant greater than 1 surrounding said components and contained within said body to provide a resistive-capacitive network in parallel with said components, said medium consisting of a silicone fluid, and electrical contacts to either end of said body whereby high power alternating currents may be introduced into said body and rectified therein.

5. A rectifier assembly as set forth in claim 1 wherein one end of the casing is closed by an expansion chamber embodying a hollow metal end cap having a closed end, a flexible imperforate diaphragm disposed transversely of the cap in spaced relation with the closed end thereof sealing the space between it and said closed end thereof, and conductive means connecting the cap with the adjacent rectifier component whereby the cap provides an electrical terminal for the device.

6. A rectifier assembly as set forth in claim 5 wherein the region between the diaphragm and the end of the cap is an air space and the remainder of the housing is filled with said medium.

7. A rectifier assembly as set forth in claim 6 wherein the diaphragm is of insulating material and the air space is completely enclosed by insulating material.

References Cited by the Examiner

UNITED STATES PATENTS

| | | | |
|---|---|---|---|
| 2,720,616 | 10/1955 | Vanderhoof | 317—234 |
| 2,745,044 | 5/1956 | Lingel | 317—234 |
| 2,781,480 | 2/1957 | Mueller | 317—234 |
| 2,854,609 | 9/1958 | Hedding | 317—234 |
| 2,918,612 | 12/1959 | Parrish | 317—234 |
| 2,979,645 | 4/1961 | Maiden | 317—234 |

FOREIGN PATENTS

| | | |
|---|---|---|
| 883,862 | 12/1961 | Great Britain. |

JOHN W. HUCKERT, *Primary Examiner.*

R. F. POLISSACK, *Assistant Examiner.*